United States Patent [19]

King

[11] 4,084,626

[45] Apr. 18, 1978

[54] AUTOMATICALLY OPERATIONAL NET WEIGHT FILLING MACHINE

[76] Inventor: Alfred T. King, 615 York Ave., Lansdale, Pa. 19446

[21] Appl. No.: 744,716

[22] Filed: Nov. 24, 1976

[51] Int. Cl.² ............. B65B 31/04; G01G 13/34
[52] U.S. Cl. .......................... 141/7; 141/59; 141/78; 141/172; 141/182; 177/111; 177/114; 222/197
[58] Field of Search .......... 53/59 W; 141/4–7, 141/59, 61, 67, 71, 72, 73, 74, 78, 80, 83, 94, 140–143, 156–161, 170, 172, 177, 275–278, 181, 182, 1, 11, 12; 177/111, 114; 222/161, 162, 197; 302/3

[56] References Cited

U.S. PATENT DOCUMENTS

| | | | |
|---|---|---|---|
| 3,404,742 | 10/1968 | Bonneric | 141/83 X |
| 3,618,684 | 11/1971 | Burke et al. | 177/114 |

Primary Examiner—Richard E. Aegerter
Assistant Examiner—Frederick R. Schmidt
Attorney, Agent, or Firm—Samuel M. Learned, Jr.

[57] ABSTRACT

An automatically operational net weight filling machine having a plurality of similar but independently adjustable operational stations which conveyably receive from a bulk storage source a loose and flowable dry particulate material, measures out an adjustably predetermined net weight amount of that material into a net weight receptacle enclosed within a chamber provided with a selected atmosphere, and then dispenses the net weight amount of that material from the net weight receptacle into an evacuated container such as a bottle or the like, wherein the respective containers are also automatically delivered to and discharged from the machine after net weight filling thereof with the subject material.

21 Claims, 16 Drawing Figures

AUTOMATICALLY OPERATIONAL NET WEIGHT FILLING MACHINE

BACKGROUND OF THE INVENTION

It is to be understood that the instant invention pertains to a machine for automatically measuring out an adjustably predetermined net weight amount of a loose and flowable dry particulate material and dispensing the same into a suitable container. In the foregoing respect, a loose and flowable dry particulate material would include but not necessarily be limited to powders such as various cosmetic, food, medicinal, and insecticide preparations; granular substances in the aforementioned categories; or any other of a number of substances which may be classified generally as being a loose and flowable dry particulate material.

In the merchandising of an increasing number of consumer products, many of which products are prepared in a loose and flowable dry particulate form, exemplary of which would be instant coffee or instant tea and the like, it has become a popular practice to package such products in containers such as wide mouth jars and the like whereby the products per se are highly visible to a consumer.

One of the problems encountered in the mechanical handling of loose and flowable dry particulate materials in accomplishing transport and measuring operations during container filling is vibration and abrasion of the material, with a resultant change in bulk density of the material. As a consequence of reduced bulk density of said material resultant from the aforementioned effects, which causes aeriation thereof, in order to dispense a certain net weight amount of said material into a container it becomes necessary to employ a larger volume container than would otherwise be necessary if one were dispensing a certain net weight amount of the subject material when not in the aerated and reduced bulk density state. Under the foregoing circumstances, after container filling and during handling and shipping operations the subject material compacts within the container to its normal bulk density with a resultant receding of the fill line from the neck of the container thereby giving the visual impression that there has been only a partial fill when in fact there is a proper net weight amount of the subject material in the container.

Another factor to be considered is that products of the type aforementioned are sold on a net weight basis, and in view of the strictly monitered and enforced sanctions against merchandisers who sell less than the net weight amount of product indicated on the container label, it is advisable that at least the net weight amount of product indicated on the label be in the container.

The expedient most frequently employed to overcome both the receding fill line effect due to reduced bulk density, as well as insuring that at least the net weight amount of product as indicated on the label is in the container, is to overfill the container, thereby resulting in the "giving away" of a certain amount of saleable product which would not otherwise be the case if net weight filling equipment were available with the mechanical capability of handling loose and flowable dry particulate materials without causing the aeration effect aforementioned and thus a reduction in bulk density, and also having the additional capabilities of providing accurate consistently repeatable predetermined net weight measuring and dispensing of said materials at speeds necessary to meet production demands.

Another factor which affects the accuracy of net weight filling operations turns on whether the material being handled and weighed is susceptible to absorption of atmospheric moisture, which not only has the effect of also changing the bulk density thereby resulting in loss of real product weighing accuracy, but additionally tends to cause agglomeration of the material to such an extent that the otherwise loose and flowable characteristics thereof are lost thereby resulting in machine fouling and various other detrimental machine effects.

The nature of the material being handled must also be considered, as in the case of insecticides, with respect to worker safety in and around the machine area. If the material to be handled is easily dusted off and of a hazardous nature the net weight filling machine configuration should provide a closed structure.

Among the prior art disclosures wherein net weight filling machines are taught, U.S. Pat. No. 2,089,534 to Carlson, dated Aug. 10, 1937, shows a bag filling mechanism which is in some respects structurally similar to the instant invention, and which incorporates a balance beam counter-balanced to the net weight measuring receptacle plus the weight of material to be measured out, however, no other teachings in Carlson are per se similar to the additional featues taught by the instant invention.

The disclosure shown in U.S. Pat. No. 2,138,356 to Ryan et al, dated Nov. 29, 1938, teaches a closed system net weight filling machine featuring a selected atmosphere environment capability, otherwise, being distinguished from the instant invention. The disclosure shown in U.S. Pat. No. 2,684,803 to Birkland et al, dated July 27, 1954, likewise teaches a closed system net weight filling machine featuring a vacuum environment capability in addition to a mechanically activated balance beam counter-balanced to the net weight measuring receptacle plus the weight of material to be measured out, and, again, otherwise distinguished from the instant invention.

As heretofore pointed out the subject of the instant invention comprises a machine which incorporates features that provide a new and novel mechanical means for automatically handling, net weighing, and dispensing into suitable containers a wide range of various substances generally classed as loose and flowable dry particulate materials wherein said instant invention is distinguishable from the prior art inventions in one or more ways in that said instant invention has utility features and new and useful advantages, applications, and improvements in the art of net weighing operations not heretofore disclosed, as set forth hereinafter.

SUMMARY OF THE INVENTION

It is the principal object of the present invention to provide an automatically operational net weight filling machine having a plurality of similar but independently adjustable operational stations each of which may be selectively set to an equivalent predetermined net weight value for respectively measuring out and dispensing into suitable containers respectively delivered thereto a net weight amount of a loose and flowable dry particulate material.

It is another object of the instant invention to provide an automatically operational net weight filling machine which accomplishes conveying of said material respectively to said operational stations from a bulk storage source, net weighs out an aliquot amount of said material and dispenses the same into a suitable container, without effecting a change in the bulk density of said material.

A further object of the instant invention is to provide an automatically operational net weight filling machine having an enclosed structure from the point of connection with the bulk storage material source to the container net weight filling position, thereby eliminating oxidation and moisture absorption effects upon said material during transport, net weight measuring, and container filling operations, in addition to eliminating material dusting off problems in and around the machine area.

It is still another object of the instant invention to provide an automatically operational net weight filling machine having both a selected atmosphere capability in an enclosed net weighing chamber thereof as well as an evacuation of container capability prior to the dispensing of an aliquot amount of said material thereto during the container filling cycle.

Yet another object of the instant invention is to provide an automatically operational net weight filling machine wherein each of the plurality of operational stations thereof is individually and independently adjustable for net weight amount during running of said machine without effecting the net weight set or accuracy of other operational stations while running.

Still another object of the instant invention is to provide an automatically operational net weight filling machine having an infinitely adjustable running speed capability from zero to maximum, and a maximum running speed commensurate with meeting production requirements while at the same time at all running speeds avoiding the problem of underweight with a minimum of overfill in the net weight measurement and dispensing of said material into said containers.

It is yet another object of the instant invention to provide an automatically operational net weight filling machine which is safe and sanitary in operation, easily maintained and cleaned, and capable of being set and operated by one not possessed of special skills or training.

Details of the foregoing objects and of the invention, as well as other objects thereof, are set forth in the following specification and illustrated in the accompanying drawings comprising a part thereof.

DETAILED DESCRIPTION OF THE INVENTION

Figure 1:
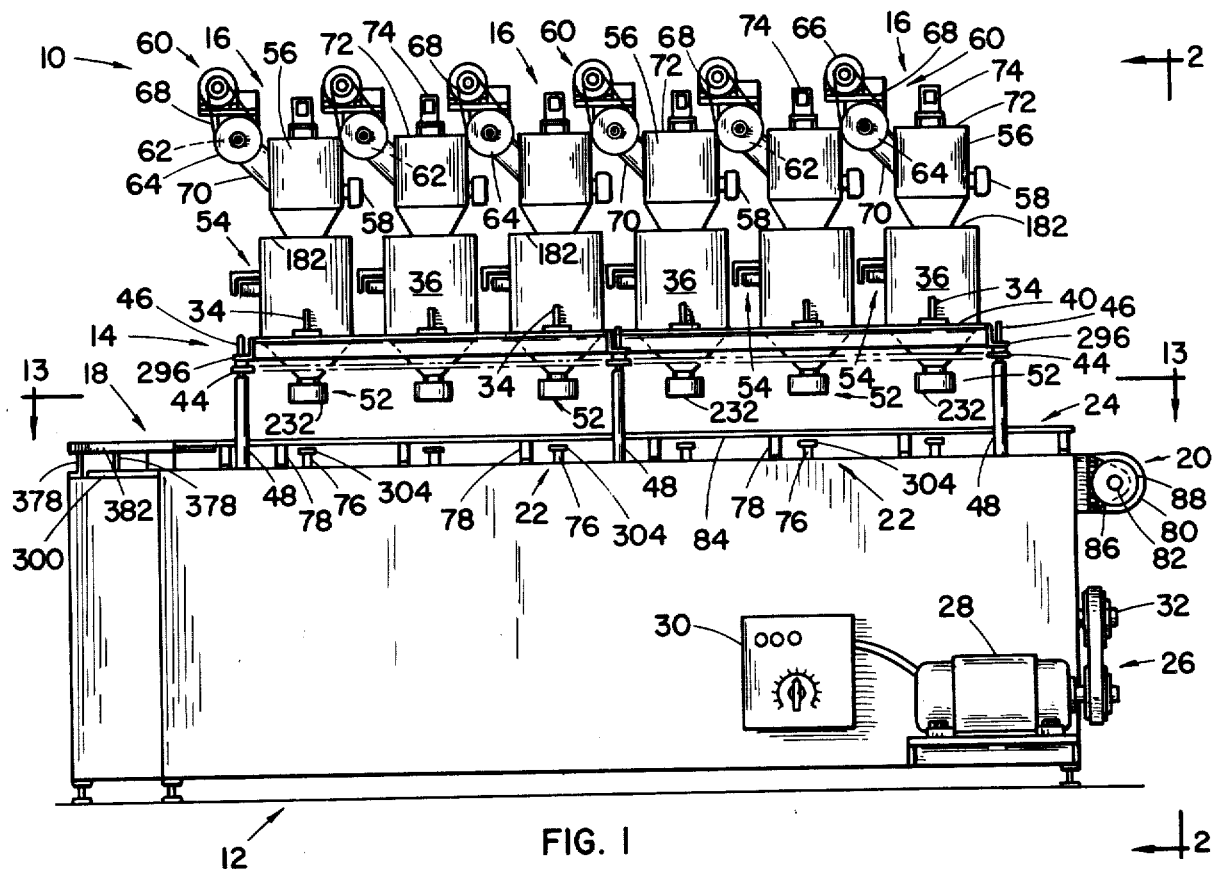
FIG. 1 is a side elevation view of an automatically operational net weight filling machine embodying the principles of the present invention.

Referring to FIG. 1, the present invention is shown which comprises an automatically operational net weight filling machine 10 having a support frame structure comprised of a base member 12 that has affixed thereto an operational station vertical adjustment assembly 14, a plurality of operational stations 16 whereby the net weight measurement and filling functions of said machine 10 are accomplished, container fee means 18 and container conveyor means 20, container pusher means 22 to respectively position a container from the feed to the fill position and then deliver said container to the discharge position, and container guide rail means 24.

Referring again to FIG. 1 to explain generally the method and operation of the machine comprising the present invention, as shown in FIG. 1, said machine 10 is provided with a plurality of operational stations 16 each of which is mechanically identical one to the other. For illustration purposes only, however, FIG. 1 shows six such operational stations 16 assembled in series, all of which function simultaneously to respectively accomplish automatic net weight measurement of an independently and adjustably set predetermined amount of a loose and flowable dry particulate material and deposit the same into a suitable container. It is to be understood that the specific number of operational stations 16 may, dependent among other things upon the total net weight filling production to be accomplished, be either more or less than the six as shown. It is also to be understood that since all operational stations 16 function in exactly the same manner only a detailed description of the functioning of one such operational station 16 will be set forth herein, with that description being equally applicable to all such other operational stations 16 irrespective of the number thereof comprising a plurality assembled in series to provide said machine 10.

The main machine drive is accomplished by means of a sprocket and chain assembly 26 from the variable speed drive motor 28 electrically powered through the variable speed control panel 30 to rotate the main drive shaft 32. All of the lower machine drive functions are taken off the main drive shaft 32 by various other means to be described in detail hereinafter. As will also be described in detail hereinafter, although the respective operational stations 16 are provided with various auxiliary drive means, the net weight fill cycle of any one of the respective operational stations 16 is only initiated upon the delivery of a container to the net weight filling position.

Figures 3, 16:
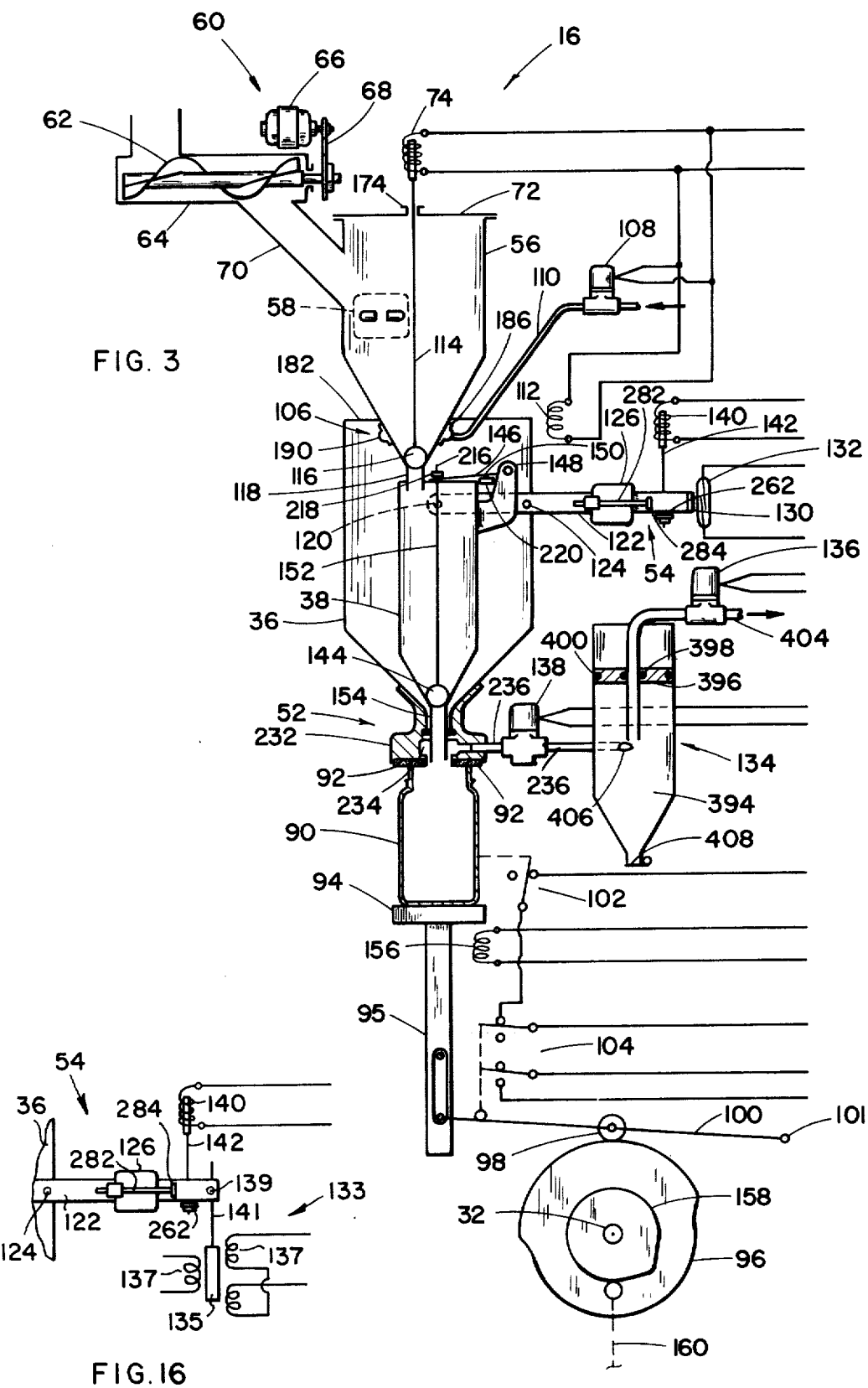
FIG. 3 is a diagrammatic side sectional elevation of one of the operational stations of said machine showing the material conveying, staging, and weighing mechanisms thereof as well as also showing the container evacuating and filling mechanisms thereof.
FIG. 16 is a fragmentary diagrammatic side sectional elevation of the balance beam assembly of an operational station of said machine, but, however, illustrating therein the alternate embodiment of a linear variable differential transformer in replacement of the magnetic reed switch assembly as diagrammatically shown in FIG. 3.

The respective operational stations 16 are affixed by means of brackets 34, weldably assembled to the outer surface of the selected atmosphere chamber 36 whereby a selected atmosphere comprised of a suitable inert gas or the like, depending upon the ambient humidity conditions and atmospheric moisture absorption characteristics of the particular loose and flowable dry particulate material being handled, may be provided about the net weight measuring chamber 38, not illustrated in FIG. 1, but shown in FIG. 3 and certain subsequent Figures, in order to prevent moisture absorbtion and/or oxidaton of said material and facilitate the handling thereof during net weight measurement and filling functions as accomplished by the employment of said machine 10. The brackets 34 of the respective operational stations 16 are in turn affixed in series at regularly spaced intervals to a laterally spaced set of longitudinally extending angle bar bracket members 40 of the operational station vertical adjustment assembly 14 of said machine 10. The angle bar bracket members 40 of the vertical adjustment assembly 14 are supported at a plurality of positions by threaded sprocket members 44 adjustably assembled upon upwardly extending threaded sections 46 of the vertical adjustment assembly support posts 48. All of the threaded sprocket members 44 are engaged by the vertical adjustment assembly link chain 50, and by means of said link chain 50 all of said sprocket members 44 are simultaneously rotatably adjustable upon said threaded sections 46 thereby enabling a simultaneous equivalent vertical displacement of all operational stations 16 so as to enable a set-up accommodation for containers of different vertical dimension.

Assembled upon the lower end of the selected atmosphere chamber 36 is the container sealing and evacuation chuck assembly 52 against which the mouth of a container to be filled is elevated and compressively sealed prior to and during air evacuation of the container and net weight filling thereof. Additionally, assembled upon one side of the selected atmosphere chamber 36 of each operational station 16 is an adjustable net weight balance assembly 54 by which the net weight amount of a loose and flowable dry particulate material to be cylically measured out and dispensed is set and individually adjusted or corrected during net weight filling operations. Lastly, assembled to the top of the selected atmosphere chamber 36 is an enclosed material staging chamber 56 which receives the loose and flowble dry particulate material from a bulk storage source and dispenses said material to the net weight measuring chamber.

The enclosed material staging chamber 56 is provided with a photoelectric level control 58 which activates the bulk storage transport assembly 60 in order to maintain a predetermined amount of loose and flowable dry particulate material in said staging chamber 56 during net weight filling operations, thereby stabilizing subsequent material handling and measurement functions during the accomplishment of said net weight filling operations. The bulk storage transport assembly 60 is comprised of a screw conveyor 62 supported in an enclosed screw conveyor housing 64 and driven by a screw conveyor motor 66 through a screw conveyor drive train 68. Material is conveyed from the bulk storage source by means of said bulk storage transport assembly 60 to the enclosed staging chamber 56 through communicating chute 70. Supported in a radially central position upon the enclosed material staging chamber cover 72 is the material staging chamber discharge valve pull solenoid 74 which controls the flow of material from the material staging chamber to the net weight measuring chamber during net weight filling operations.

Figure 2:
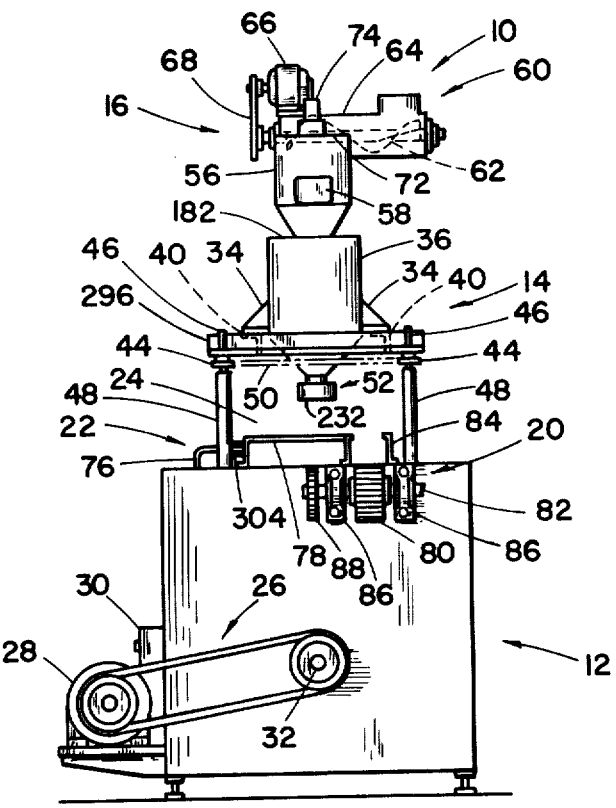
FIG. 2 is an end elevation of said machine as seen along the line 2—2 of FIG. 1.

The view shown in FIG. 2 illustrates an end elevation of the machine 10 as seen along the line 2—2 of FIG. 1, more particularly showing the container positioning pusher 76 which delivers a container from the infeed conveyor to the container elevating platen, adjustable container side guide rail 78 by which a container is guided during delivery from the infeed conveyor through the fill position and onto the discharge conveyor 80 which is driven through the container conveyor drive shaft 82 by a separate drive train, not shown, off the main drive shaft 32 being powered and timed through the variable speed control panel 30. Also shown is the adjustable discharge conveyor guide rail 84. It will be noted that the delivery end of the discharge conveyor is assembled to the base member 12 of machine 10 as shown by means of the container conveyor drive shaft bearing housings 86 which support the container conveyor drive shaft 82 upon which is also assembled the infeed conveyor driving gear 88.

Referring now to the diagrammatic side sectional illustration of an operational station 16 as shown in FIG. 3, to more specifically explain the details of the instant invention, generally, the set-up and cycle of operation of the net weight filling machine 10 is as follows. Depending upon the height and diameter dimensions of a particular run of container, exemplary of which is the container 90 as shown in FIG. 3, the operational stations 16 are uniformily adjusted vertically by means of the vertical adjustment assembly link chain 50 of the operational station vertical adjustment assembly 14 in the manner previously described so that when a plurality of the subject containers 90 are simultaneously but independently elevated to the net weight fill position respectively in compressive engagement with the container sealing gasket 92 of the evacuation chuck assembly 52 of the operational stations 16, the proper vertical set will be made in the respect of obtaining an adequate seal between the container opening and said chuck assembly 52 so as to respectively enable an equivalent container evacuation simultaneous with the net weight filling thereof.

The mechanism provided to accomplish elevation of a container 90 into compressive engagement with the container sealing gasket 92 is the container elevating platen 94, which is driven in timed reciprocal vertical cycles through column 95 by the container elevating platen cam 96 motion which is translated through the container elevating platen cam follower 98 affixed to the pivotally mounted container elevating platen lever arm 100 pivotally assembled to shaft 101. It should be noted that the container elevating platen cam 96 is keyably assembled to and driven by the main drive shaft 32. It should further be noted that a net weight fill cycle for any particular operational station 16 will not be initiated unless a container 90 is delivered to and in position upon the container elevating platen 94 as sensed by a closing of the container detection switch 102 when the body of a container 90 pushes the container detection switch 102 to a closed contact position as shown in FIG. 3. Upon a closing of the container detection switch 102 the net weight fill cycle as hereinafter described is commenced.

When said machine 10 is started and the electrical control circuit thereof is turned on there is an energizing of the material staging chamber discharge valve pull solenoid 74 thereby holding the material staging chamber discharge valve 116 in the open position, as well as a simultaneous energizing of the air knife solenoid 108, and at operator option, energizing of the magnetic vibrator 112, all of which remains in the aforementioned energized state until there is dispensed into the net weight measuring chamber 38 the pre-set net weight fill amount of said loose and flowable dry particulate material to be dispensed therefrom to a container 90, whereupon, magnetic reed switch 132 makes contact and trips a suitable relay, not shown, through which is caused a quick closing of the material staging chamber discharge valve 116 and a simultaneous deactivation of air knife assembly 106 and magnetic vibrator 112. At this point the net weight contents of said chamber 38 are maintained therein and only dispensed therefrom if a container 90 is in position to receive the discharge as hereinafter described.

With a container 90 in position upon the container elevating platen 94 and the container detection switch 102 in the closed contact position as heretofore described, the double contact net weight fill cycle initiation switch 104, which only completes circuit closing if the container detection switch 102 is also in the closed contact position, triggers the balance beam pull solenoid 140 as said double contact net weight fill cycle initiation switch 104 is moved to the closed contact position by pivotal elevation of the container elevating platen lever arm 100 as the container elevating platen cam follower 98 traces to the high lobe of the container elevating platen cam as also shown in FIG. 3. Upon multiple closing of the respective switches aforementioned the net weight fill amount is discharged to container 90.

Previously and continually upon sensing command of the photoelectric level control 58 the bulk storage transport assembly 60 will, by means of screw conveyor 62, intermittently deliver and maintain in the enclosed material staging chamber 56 a certain close range constant amount of material for net weight filling measurement discharge to the net weight measuring chamber 38. In addition to maintaining a close range of constant level amount of material in the enclosed material staging chamber 56, for purposes of stabilizing material flow upon the discharge to the net weight measuring chamber 38, two other material flow assistance means are provided, either of which, depending upon the flow characteristics of the material being handled, may be employed singly or in combination in order to facilitate material flow from the enclosed material staging chamber 56 to the net weight measuring chamber 38. The first of the other material flow assistance means is comprised of an "air knife" assembly 106, which is circumscribably affixed by weldments about the lower periphery of the conical section of the material staging chamber 56, and is comprised of a plurality of nozzle shown in greater detail respectively in FIG. 4 and FIG. 7, which nozzles direct either an air or inert gas film as appropriate, depending upon the physical handling and oxidation and moisture absorption characteristics of the particular material being handled, down the interior conical surface of the enclosed material staging chamber 56 and thereby provide a directed gas film surface and additional propelling force by which the subject material is not only gravitationally conveyed but also impelled into the net weight measuring chamber 38. The air knife gas is metered under regulated pressure by way of the air knife solenoid 108 through line 110 for distribution through the air knife assembly 106, which is likewise activated upon activation of the material staging chamber discharge valve pull solenoid 74. The second of the other material flow assistance means to facilitate material flow from the enclosed material staging chamber 56 to the net weight measuring chamber 38 is comprised of a magnetic vibrator 112, which may also be activated upon activation of the material staging chamber discharge valve pull solenoid 74 to further enhance the flow of material from the enclosed material staging chamber 56 to the net weight measuring chamber 38.

Upon triggering of the material staging chamber discharge valve pull solenoid 74, which elevates the material staging chamber discharge valve connecting rod 114 and thereby elevates the material staging chamber discharge valve 116 enabling material to flow gravitationally with air knife assembly 106 and magnetic vibrator 112 assistance through the material staging chamber discharge port 118, the net weight measurement of material per se is commenced.

Mechanically, the net weight measuring chamber 38, enclosed within the selected atmosphere chamber 36, is pivotally assembled at pivot point 120 to one end of the net weight balance beam 122 which in turn is pivotally assembled about pin 124. Counterbalancing the net weight measuring chamber 38 is counterbalance weight 126 assembled to the net weight balance beam 122 such that when the net weight measuring chamber 38 is in a clean empty condition said balance beam 122 will be in a neutral counterbalanced configuration as illustrated in FIG. 3. The amount of material to be net weight measured is set by the threadably adjustable weight 128 prior to net weight filling operations, but which may be changed or corrected during filling operations. Affixed at the outer end of the net weight balance beam 122 is an adjustable magnet 130 which operates to close vertically adjustable magnetic reed switch 132 immediately upon there being a net weight amount of material delivered to the net weight measuring chamber 38, which in turn initiates the following net weight fill cycle functions.

First, the material staging chamber discharge valve pull solenoid 74 is de-energized thereby displacing the material staging chamber discharge valve 116 downward to close the material staging chamber discharge port 118 and stop further discharge of material from the enclosed material staging chamber 56 to the net weight measuring chamber 38.

Concurrent with the foregoing functions, the adjustable container evacuation chamber 134 will have been evacuated with the evacuation solenoid valve 136 open and the container evacuation solenoid valve 138 closed. Simultaneously, at this point, the balance beam pull solenoid 140 will be energized and acting through pull rod 142 cause the net weight balance beam 122 to pivot about pin 124 thereby also causing the net weight measuring chamber 38 to be urged vertically downward and impact the interior terminal cone end of the selected atmosphere chamber 36. Also, concurrently, the net weight measuring chamber discharge valve 144 will be opened by the action of lever arm 146 pivotally assembled to bracket 148 as acted upon by fulcrum 150 as the net weight measuring chamber 38 is urged vertically downward, elevating the net weight measuring chamber discharge vale connecting rod 152 and thereby dispensing the net weight measured amount of material from the net weight measuring chamber 38 through the net weight measuring chamber discharge port 154 into a container 90 which is being simultaneously evacuated by an opening of the container evacuation solenoid valve 138 and closing of solenoid valve 136 thereby enabling the air in container 90 to flow into the previously evacuated adjustable container evacuation chamber 134.

It should be noted that three means operate simultaneously to effect a quick, clean, and complete dispensing of a net weight measured amount of material from the net weight measuring chamber 38 into a container 90. First, the simultaneous opening of the net weight measuring chamber discharge valve and the sharp impacting of the net weight measuring chamber 38 with the interior terminal cone end of the selected atmosphere chamber 36. Second, the simultaneous evacuation of a container 90 as a measured net weight amount of material is being dispensed thereto. And, third, a container elevating platen magnetic vibrator 156 is additionally provided to enhance material dispensing from the net weight measuring chamber 38 to the container 90.

Upon completion of the net weight fill cycle as heretofore described, the recycle cam 158 elevated lobe engages the recycle switch 160 and the operational station 16 is reset for another net weight measuring and dispensing cycle, and again energizing the material staging chamber discharge valve pull solenoid 74.

As the container elevating platen cam follower 98 traces to the low lobe level of the container elevating platen cam 96 the column 95 lowers whereby the top of the container elevating platen 94 is brought to a level with the discharge conveyor 80 so that the net weight filled container 90 may be delivered thereto and a clean empty container 90 delivered to the container elevating platen 94.

Figure 4:
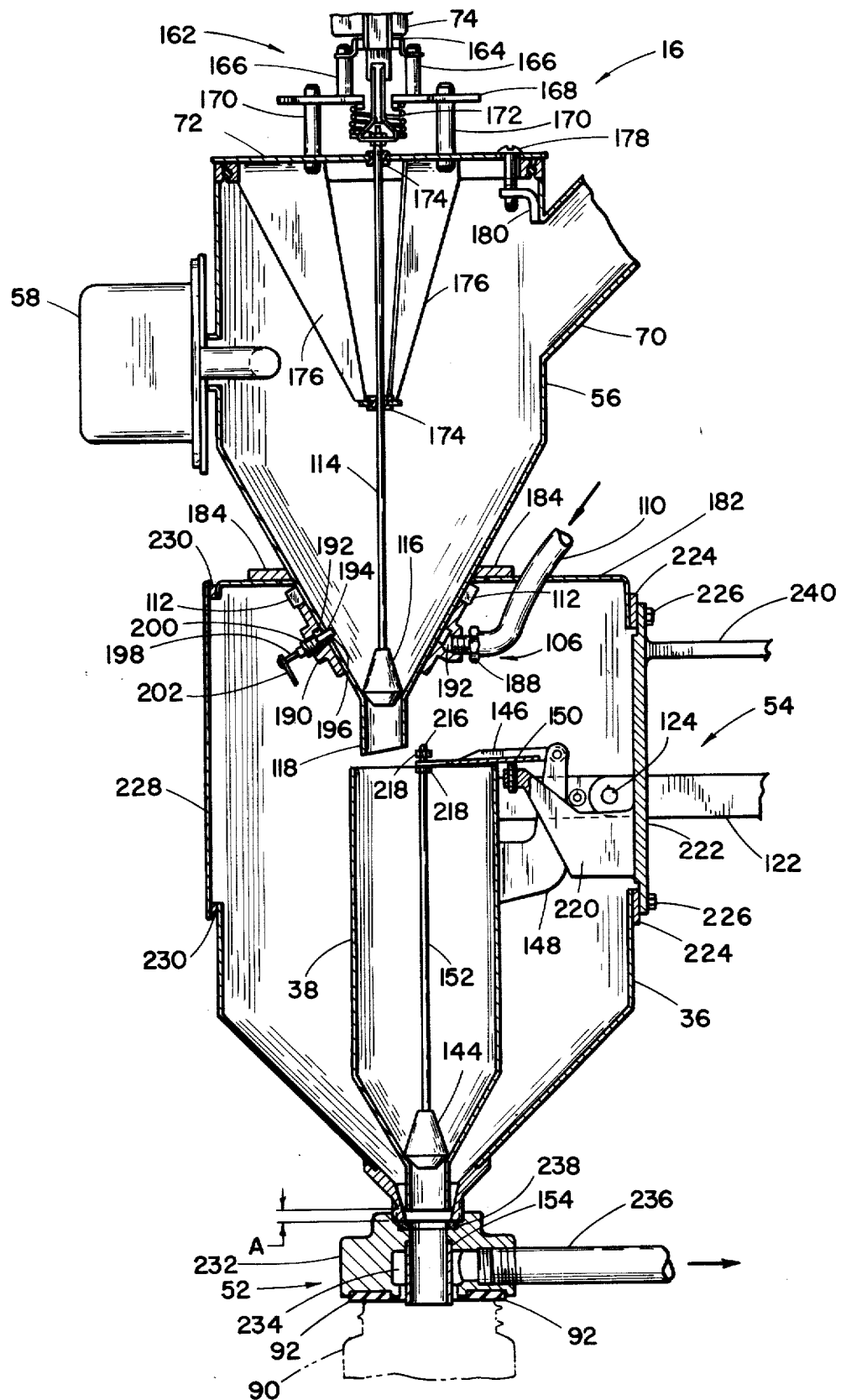
FIG. 4 is an enlarged side sectional elevation of the material staging and weighing mechanisms as well as also the filling mechanism of an operational station as shown in FIG. 3.

The view shown in FIG. 4 is an enlarged sectional elevation of certain of the operational station 16 features illustrated diagrammatically in FIG. 3, but showing a greater mechanical detail thereof. In particular, the material staging chamber discharge valve pull solenoid mounting assembly 162 is shown, being comprised of a solenoid mounting bracket 164 assembled to spacer rods 166 in turn assembled to the coil spring compression plate 168. The coil spring compression plate 168 is supported and retained by spacer bars 170 which in turn are affixed to the enclosed material staging chamber cover 72. The vertical positioning adjustment of the coil spring compression plate is determined by the setting necessary to obtain sufficient pressure from the coil spring 172 to enable quick and positive opening and closing of the material staging chamber discharge valve 116 upon the energizing or de-energizing of the material staging chamber discharge valve pull solenoid 74. As is also shown, connecting rod guide bushings 174 are provided to stabilize the vertical pull/push displacement of the material staging chamber discharge valve connecting rod 114, wherein one such guide bushing 174 is centrally provided in the enclosed material staging chamber cover 72 and the other such guide bushing 174 is centrally supported by vertically depending vanes 176 midway of the length of said connecting rod 114. Additionally shown is the means of securing the enclosed material staging chamber cover 72 as by a cover securing bolt 178 threadably inserted through an angled cover securing bolt bracket 180.

Securing the enclosed material staging chamber 56 to the selected atmosphere chamber cover 182 is accomplished by welding a mounting ring 184 peripherally about the lower external conical surface of the enclosed material staging chamber 56 and then in turn welding the mounting ring 184 to the selected atmosphere chamber cover 182 in such a manner as to obtain and provide an air-tight seal.

Interior of the selected atmosphere chamber 36, affixed peripherally about the lowest most external conical surface of the enclosed material staging chamber 56, below the magnetic vibrator 112, is the air knife assembly 106 comprised of an air knife assembly gas distribution manifold 186 which is weldably assembled by means of air-tight weldments to said lowest most external conical surface of the enclosed material staging chamber 56, wherein said gas distribution manifold 186 is provided with a gas inlet port 188 communicating externally by means of line 110 through the air knife solenoid 108 with a regulated pressure gas supply, which gas may be air per se or any other of a number of gasses depending upon which gas is most suited in use application with the particular material being handled, and communicating internally with three adjustable air knife housings 190 by means of annular channel 192, wherein said air knife housings 190 in turn communicate interior of said conical surface through three air blade openings 194 disposed at equal radial arcs about said conical surface. The air blade 196 is comprised of a slotted opening near the closed end of a tubular manifold 198 which communicates with the annular channel 192. The tubular manifold 198 is maintained in the adjustable air knife housing 190 by a bearing sleeve 200, which enables a radial direction adjustment of the air blade 196 within and along the interior conical surface of the enclosed material staging chamber 56. The handle 202 enables rotational adjustment of the air blade 196 as well as also indicating the axis of orientation of the air blade direction.

Additional detail shown in respect to the adjustable net weight balance assembly 54 includes the threaded end 216 of the net weight measuring chamber discharge valve connecting rod 152 and the adjustment nuts 218 by which the setting necessary to obtain quick and positive opening and closing of the net weight measuring chamber discharge valve 144 upon the energizing or de-energizing of the balance beam pull solenoid 140 is achieved. Also shown is the bracket mounting arm 220 for the fulcrum 150, wherein as shown said fulcrum 150 is threadably adjustable vertically in order to obtain a proper fulcrum set.

The adjustable net weight balance assembly 54 is affixed to the side of the selected atmosphere chamber 36 by means of bolting the net weight balance assembly base plate 222 to said selected atmosphere chamber 36 with air tight sealing gasket 224 compressed therebetween. Bolts 226 provide the means for accomplishing the aforementioned affixment.

Opposite the affixment position of the net weight balance assembly base plate 222 upon the side of the selected atmosphere chamber 36 there is provided an observation and access window 228 which is likewise sealed by an air-tight gasket 230, wherein said window enables access for maintenance and adjustment of the aforementioned machine assemblies housed within the selected atmosphere chamber 36 as well as enabling observation thereof during net weight filling operations.

Assembled to the terminal end of the selected atmosphere chamber cone section is the container sealing and evacuation chuck assembly 52 which provides the means whereby the mouth of a container 90 is compressively sealed against the container sealing gasket 92 during container evacuation and net weight filling operations. It will be noted that the vacuum chuck housing 232 is provided with an interior annular vacuum channel 234 which opens into the container mouth, but at a point above the terminal end of the net weight measuring chamber discharge port 154, which thereby enables simultaneous container evacuation and net weight filling without the problem of having product carry-over through the evacuation line 236 into the adjustable container evacuation chamber 134.

Also shown in FIG. 4 is the vertical displacement distance "A," which the net weight measuring chamber 38 vertically traverses upon energizing of the balance beam pull solenoid 140 to cause a sharp impact of the external bottom cone section of the net weight filling chamber 38 with the resilient impact gasket 238 whereby discharge of the net weight amount of material to be dispensed from the net weight measuring chamber is facilitated.

The machine 10 as heretofore and as will hereinafter be disclosed preferably is constructed of metal, but any other suitable materials or combination thereof may be used.

Figure 5:
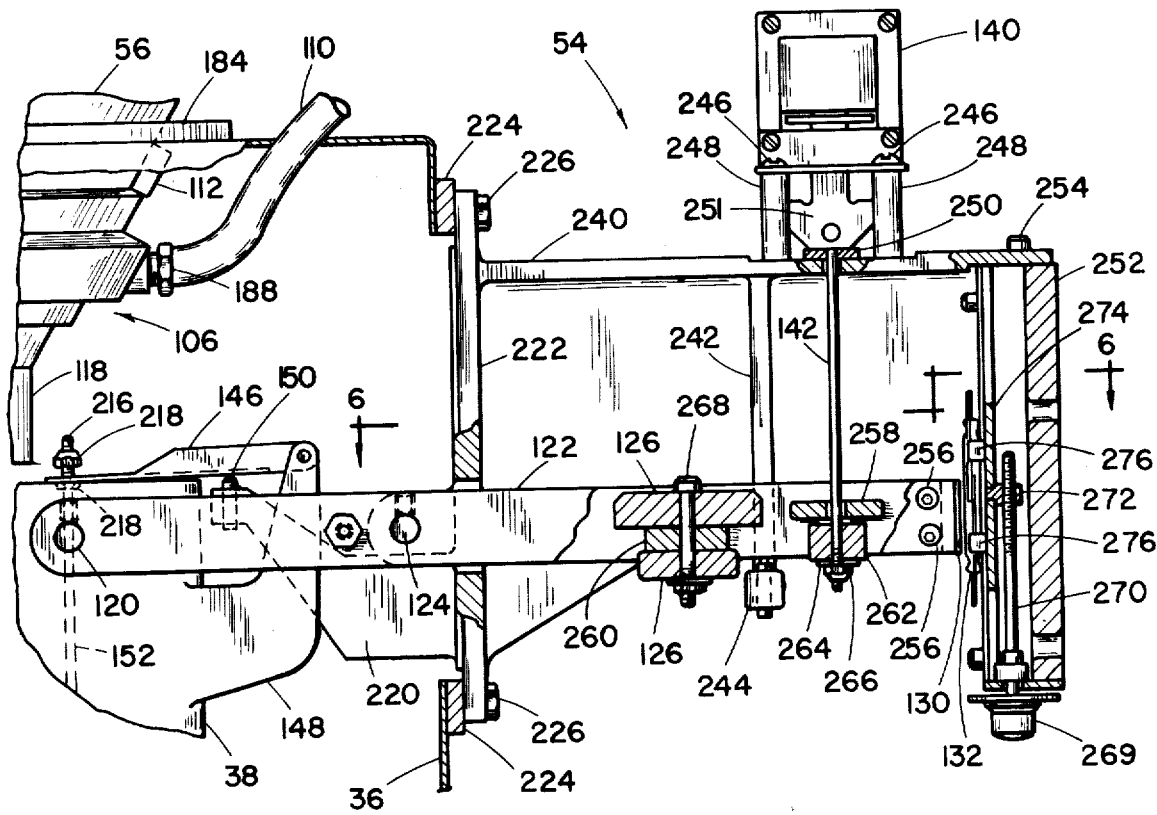
FIG. 5 is an enlarged side sectional elevation of the balance beam assembly of an operational station of said machine.
Figure 6:
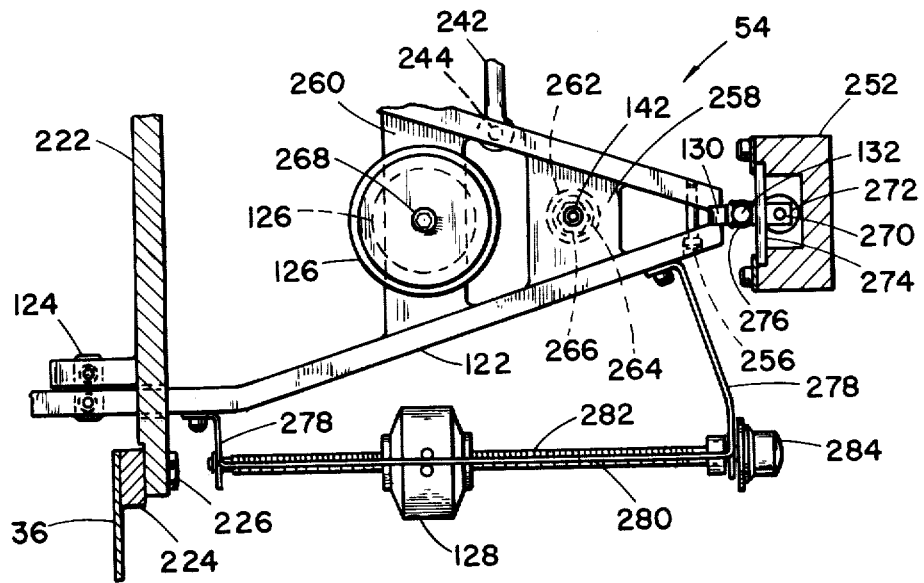
FIG. 6 is a top plan view of the adjustable net weight measurement sub-assembly of the operational station balance beam assembly as seen along the line 6—6 of FIG. 5.

Referring now to FIG. 5 and FIG. 6, which respectively show an enlarged fragmentary side sectional elevation and enlarged fragmentary top plan view of the adjustable net weight balance assembly 54. As shown in FIG. 5, said adjustable net weight balance assembly 54 is assembled to the selected atmosphere chamber 36 by means of the net weight balance assembly base plate 222 and bolts 226. Extending perpendicularly outward from said net weight balance assembly base plate 222 and weldably assembled thereto is support plate 240 to which is affixed the balance beam load stop support bracket 242 having threadably assembled to the lower end thereof the balance beam load stop screw 244 which serves to support the net weight balance beam 122 when a net weight load amount is set thereon by means of the threadably adjustable weight 128. Also affixed to said support plate 240 is the balance beam pull solenoid mounting assembly comprised of screws 246 and spacers 248 as well as resilient armature stop 250 against which the balance beam pull solenoid armature 251 rests when said balance beam pull solenoid 140 is in a de-energized state, in addition to there being affixed to said support plate 240 the magnetic reed switch mounting and adjustment bracket 252 by means of affixment screw 254.

It will be noted that affixed to the net weight balance beam 122, as previously described, is the adjustable magnet 130 which is held in a fixed position at the end of said balance beam 122 by means of compression screws 256. Also assembled to said balance beam 122 by means of weldments are the pull solenoid engagement cross member 258 and the counterbalance weight assembly cross member 260. The pull solenoid engagement cross member 258 provides an engagement surface against which the resilient pull solenoid plunger 262, assembled and retained upon pull rod 142 as shown by means of washer 264 and self-locking nut 266, acts upon initiation of the net weight dispensing cycle as previously described. The counterbalance weight assembly cross member 260 provides a mounting surface to which counterbalance weights 126 are assembled and retained by means of the counterbalance weight bolt, washer, and nut assembly 268.

The amount of weight comprising the counterbalance weights 126 is determined by that amount which is necessary to compensate for and counterbalance the net weight measuring chamber 38 and maintain the net weight balance beam 122, with the assemblies aforementioned affixed thereto, in a neutral balanced configuration when the threadably adjustable weight 128 is set at a zero weight reading. In the aforementioned net weight balance beam 122 configuration the adjustable magnet 130 and the magnetic reed switch 132 are adjusted and set so that said magnetic reed switch is open but will close and make contact the instant net weight balance beam 122 rises off of adjustable stop screw 244.

The magnetic reed switch is vertically adjustable through the magnetic reed switch adjustment knob 269 to accomplish the set aforementioned by means of threaded magnetic reed switch vertical adjustment screw 270 threadably engaged through threaded adjustment block 272 affixed to the magnetic reed switch adjustable slide 274 upon which magnetic reed switch spring clips 276, carrying the magnetic reed switch 132, are mounted. Thereby, when a net weight amount of material, as set by the threadably adjustable weight 128 has been delivered from the enclosed material staging chamber 56 to the net weight measuring chamber 38, causing the net weight balance beam to pivot about pin 124 and obtain the neutral balanced configuration aforementioned, the magnetic reed switch will close and make contact and initiate the net weight dispensing cycle to a container 90 as heretofore described.

It should be noted at this point that a magnetic reed switch is the preferred means for causing initiation of the wet weight fill dispensing, however, other means such as a linear variable differential transformer (LVDT) 133 as illustrated in FIG. 16 is an equally suitable alternate means for instantly sensing angular deflection motion of said net weight balance beam 122 whereby initiation of an operational station net weight fill dispensing cycle may also be commenced. The LVDT 133 is comprised of a vertically depending armature 135 which is suspended between the LVDT coils 137 and vertically adjustable therebetween for accomplishing net weight balance beam 122 net weight set or adjustment by means of the armature adjustment set screw 139 which compressively engages the vertically adjustable armature suspension rod 141 to which said armature 135 is affixed. Likewise, a light beam, or any other similar such suitable device may be equally well employed.

The enlarged fragmentary top plan view shown in FIG. 6 further shows the means whereby the threadably adjustable weight 128 is assembled by mounting bracket means 278, supporting a weight set indication plate 280 and adjustable weight set screw 282 upon which said adjustable weight 128 is threadably assembled and moveable by means of knob 284. Also, as previously pointed out, it is the externally mounted threadably adjustable weight 128 which provides the capability enabling individual operational station 16 net weight amount change and/or correction during net weight filling operations.

Figure 7:
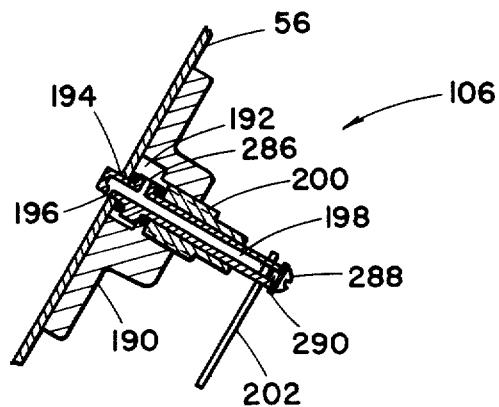
FIG. 7 is an enlarged side sectional view of an air blade assembly as shown affixed to the material staging chamber in FIG. 4.

Referring now to FIG. 7, wherein is shown an enlarged side sectional elevation of the air knife assembly 106, and is further shown the gas entry port 286 from the annular channel 192 to the tubular manifold 198 whereby gas is directed to the air blade 196. Also shown is the tubular manifold closure screw 288 and tubular manifold closure screw sealing gasket 290, wherein cleaning and removal of obstructions from the tubular manifold 198 may be accomplished by a removal of said closure screw 288.

Figure 8:
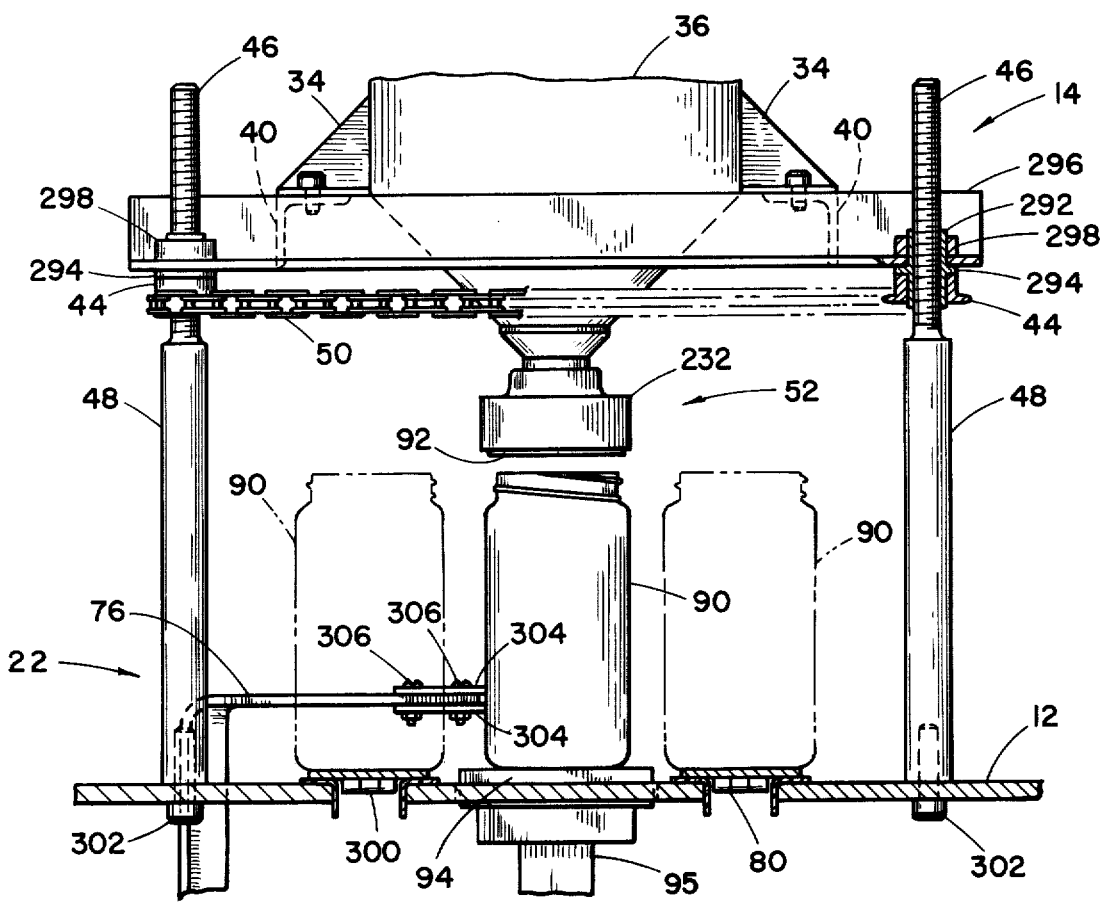
FIG. 8 is a fragmentary enlarged end elevation of said machine showing the operational station vertical adjustment means which thereby enables the accommodation of containers of different heights.

The view shown in FIG. 8 illustrates in greater detail the operational station vertical adjustment assembly 14 as heretofore described, additionally showing, among other things, the thrust bushing 292 of the threaded sprocket member 44, wherein said thrust bushing 292 threadably engages the upwardly extending threaded section 46 of the vertical adjustment assembly support post 48 and supports upon the collar flange 294 thereof the lateral angle bar bracket member 296 of the operational station vertical adjustment assembly 14. The aforementioned sprocket assembly, in combination with the upwardly affixed retaining flange 298, provides that means whereby, upon driving of the vertical adjustment assembly link chain 50 the operational station vertical adjustment assembly 14, to which is assembled all of the operational stations 16 comprising machine 10, traverses a vertical movement upward or downward to accommodate the vertical dimension of the particular container 90 being run.

Additionally shown in FIG. 8 is the container infeed conveyor 300, the vertical adjustment assembly support post securing bolts 302, and the container positioning pusher arms 304 which are replaceable by means of assembly bolts 306 in order to accommodate containers of different diameter dimension.

Figure 9:
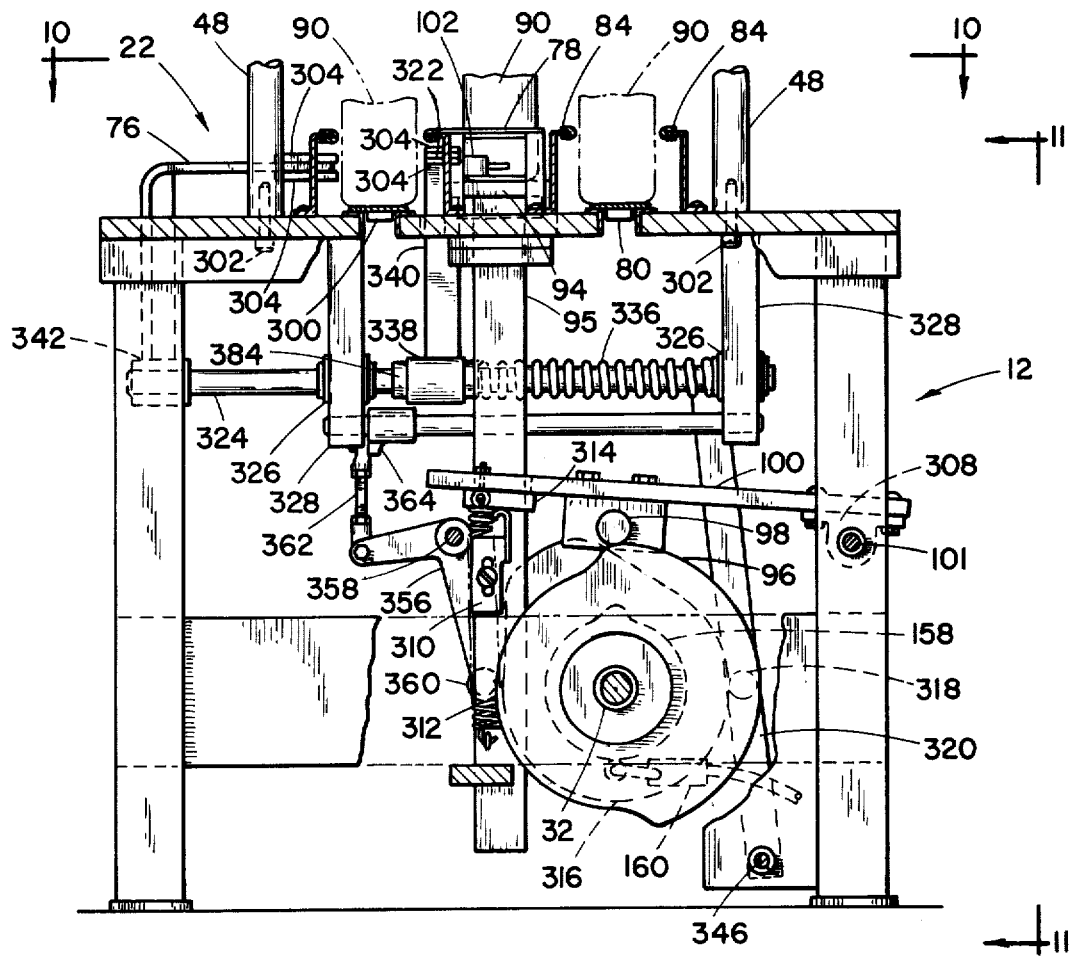
FIG. 9 is an enlarged end sectional elevation of the operational station container delivery, elevating, and discharge mechanisms for said machine as seen along the line 9—9 of FIG. 11.

The view shown in FIG. 9 is a fragmentary enlarged end sectional elevation of the machine 10, showing in particular those assemblies of said machine 10 whereby containers 90 are delivered from the container infeed conveyor 300 to the container elevating platen 94, elevated to the compressive seal position for container evacuation and net weight fill dispensing, lowered to the discharge position, and then delivered to the discharge conveyor 80 for delivery to closure and cartoning operations.

Considering first the elevation and lowering of a container positioned upon the container elevating platen 94, the container elevating platen 94 is driven in reciprocal vertical motion by translation of the container elevating platen cam 96 rotary motion to lineal vertical motion through engagement with the container elevating platen cam follower 98 assembled to the container elevating platen lever arm 100 which is pivotally assembled to shaft 101 by means of bearing brackets 308 at one end thereof and to the column 95 by means of the vertical motion assembly bracket 310 at the other end thereof wherein said bracket 310 is held under the compressive spring force of spring 312 attached at the lower end thereof to the column 95 and at the upper end thereof to the container elevating platen lever arm 100 thereby firmly engaging the vertical motion assembly bracket 310 against the pivotal contact block 314 such that if for any reason the vertical motion of column 95 is restricted, such as in the event of a container feeding jam or the like, the spring 312 will stretch and thereby prevent machine damage. The elevation and lowering of a container 90 positioned upon the container elevating platen 94, and the container dwell time in either the elevated container evacuation and net weight fill position or in the lowered container feed and discharge position is determined by the profile of the container elevating platen cam 96, which is firmly keyed to the main drive shaft 32 so that the container elevating platen cam 96 will rotate as a unit with other cams also firmly keyed to the main drive shaft 32 by which other cams there are provided the drives for container delivery and discharge functions and the machine recycle function upon completion of a net weight filling cycle.

The container delivery and discharge functions, whereby an empty container is delivered from the container infeed conveyor 300 to the container elevating platen 94, and upon completion of the net weight fill cycle delivered from the container elevating platen 94 to the discharge conveyor 80, are driven by the container delivery and discharge cam 316 which is also firmly keyed to the main drive shaft 32, and by means of trace engagement with the container delivery and discharge cam follower 318, assembled to the container delivery and discharge lever arm 320, accomplishes translation of rotary motion into lineal horizontal motion to in turn accomplish container delivery to and discharge from the container elevating platen 94 respectively and concurrently by the container positioning pusher 76 and the container discharge pusher 322 which is also provided with container positioning pusher arms 304 likewise replaceable to accommodate different container diameters.

The translation of rotary to lineal horizontal motion aforementioned is imparted concurrently to the container positioning pusher 76 and the container discharge pusher 322 through lineal motion shaft 324 supported in linear ball bushings 326 which in turn are assembled on axial alignment within and supported by the lineal ball bushing support plates 328, wherein the lineal motion shaft 324 is free to reciprocate lineraly within said ball bushings 326 but restricted from rotation by container positioning pusher 76 operating in guide slot 344. The mechanical assembly by which the container delivery and discharge lever arm 320 lineal motion translation to the lineal motion shaft 324 is accomplished is through the linear motion connecting rod 330, not illustrated in FIG. 9 but seen in FIG. 10, wherein said linear motion connecting rod 330 is assembled to the container delivery and discharge lever arm 320 at one end thereof by a spherical rod end bearing 332 and also at the other end thereof by another spherical rod end bearing 332 to a fixed lineal motion shaft collar pin 334. The lineal translation motion imparted to the lineal motion shaft 324 is against the compressive force of return spring 336 which is installed peripherally upon said lineal motion shaft 324 in compressive engagement between the discharge side lineal ball bushing support plate 328 and the container discharge pusher connecting arm mounting collar 338 which is rotatably assembled between fixed collars 384 to the lineal motion shaft 324. Because the container discharge pusher connecting arm mounting collar 338 is rotatably mounted to the lineal motion shaft 324, only lineal motion of the lineal motion shaft 324 will be transmitted from the mounting collar 338 by way of the container discharge pusher connecting arm 340 to the container discharge pusher 322. However, the container positioning pusher 76, also assembled to the lineal motion shaft 324 by means of the container positioning pusher mounting collar 342, is assembled so as to be fixed to linear motion shaft 324 limiting any axial rotation motion of the lineal motion shaft 324. Therefore, in order to accomplish transverse support for the container positioning pusher 76 during translational container pusher motion, guide means not illustrated in FIG. 9 but also shown in FIG. 10, comprising guide slots 344, are provided.

As the rotary to lineal translation of motion above described, which causes the container delivery and discharge lever arm 320 to move arcuately outward about pivot shaft 346, the lineal motion shaft 324 is moved lineraly forward through displacement of the linear motion connecting rod 330 against compressive force of the return spring 336 thereby also causing the container positioning pusher 76 and the container discharge pusher 322, both of which are assembled to the lineal motion shaft 324 for linear displacement motion, to concurrently move forward with the container discharge pusher 322 engaging and moving a net weight filled container 90 from the lowered container elevating platen 94 to the discharge conveyor 80 and the container positioning pusher 76 engaging and moving an empty container 90 from the container infeed conveyor 300 to the lowered container elevating platen 94 prior to recycling of the machine 10 operational station 16 for another net weight fill cycle. Upon completion of the respective container 90 discharge and delivery operations above described the container delivery and discharge cam follower 318 traces to the low profile configuration of the container delivery and discharge cam 316 during which the compressive force of return spring 336, acting upon the container discharge pusher connecting arm mounting collar 338, displaces the lineal motion shaft 324 to the recycle start position which is completed upon engagement of the container delivery and discharge cam follower 318 against the low profile configuration of cam 316.

The lineal displacement of the container positioning pusher 76, in both forward and return, is a simple mechanical motion. However, the lineal displacement of the container discharge pusher 322, although in forward is simple, upon return to a recycle position is a compound mechanical motion involving both lineal and arcuate functions in order to clear the empty container 90 positioned upon the container elevating platen 94 for recycled net weight filling operations.

Generally, referring to FIG. 11, the return of the container discharge pusher 322 to the recycle position is accomplished as follows. The container discharge pusher connecting arm 340 is provided with a re-set cam follower mounting arm 350 to which the re-set cam follower 352 is rotatably assembled. During filled container discharge from the container elevating platen 94 to the discharge conveyor 80, as accomplished by the motion of the container discharge pusher 322 as heretofore described, the re-set cam follower 352 traces a horizontal path along configured cam 354 during discharge transfer of a net weight filled container. At the end of the net weight filled container discharge transfer the re-set cam follower 352 drops to the inclined re-set cam surface 355 thereby also inclining the container discharge pusher 322 during return spring 336 re-set transfer thereof so as to enable said container discharge pusher 322 to clear the empty container previously positioned upon the container elevating platen 94 by the container positioning pusher 76, all of which is illustrated in fragmentary enlarged side sectional elevation in FIG. 11. Upon return of the container discharge pusher 322 to the re-set position it becomes necessary to arcuately elevate the re-set cam follower 352 to the recycle position, which is accomplished by a bell crank motion that is also driven by the container delivery and discharge cam 316, the same of which is best illustrated in FIG. 9.

Figure 12:
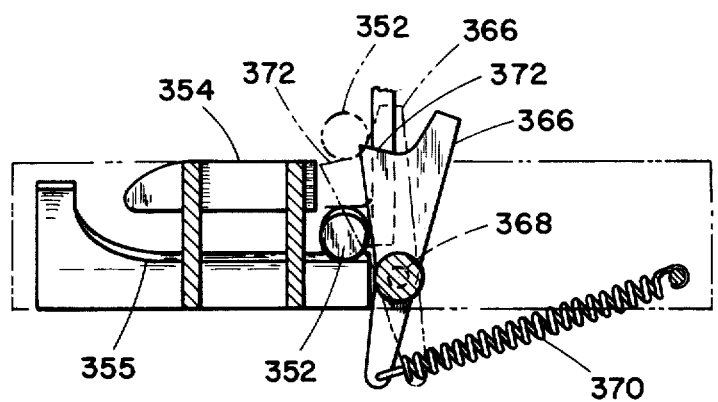
FIG. 12 is an enlarged side elevation of an operational station container discharge re-cycle cam and cam follower assembly and lock mechanism as seen along the line 12—12 of FIG. 11.

Referring again to FIG. 9, a bell crank 356 is shown which pivots about the bell crank pivot shaft 358 and is driven in right angle motion translation by trace engagement of the bell crank cam follower 360 with profile configuration of the container delivery and discharge cam 316. Right angle motion of the bell crank 356 is transmitted through the connecting rod assembly 362 to re-set lever 364 which engages and elevates the re-set cam follower 352 to the recycle position and in turn positions the container discharge pusher 322 in a discharge configuration behind an empty container 90 disposed in a net weight fill position upon the container elevating platen 94. Greater detail of the re-set cam assembly as heretofore described is shown in FIG. 12, wherein is also illustrated the spring tensioned re-set latch 366 which pivots about the pivot stud 368 against the force of tension spring 370 during recycle elevation of the re-set cam follower 352 from a return position upon the inclined re-set cam surface 355 to the configured cam 354 surface. It will also be noted that the lip 372 of the spring tensioned re-set latch, in effect, forms a part of the configured cam 354 surface.

Figure 10:
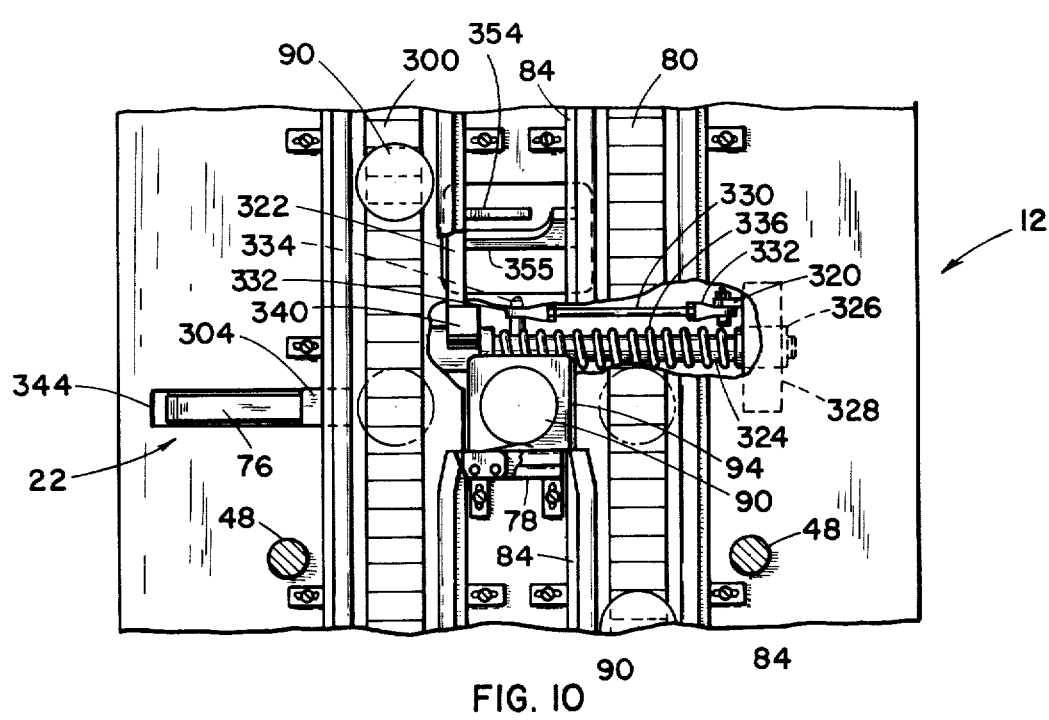
FIG. 10 is a fragmentary top plan view of the operational station container delivery, elevating, and discharge mechanisms as seen along the line 10—10 of FIG. 9.
Figure 11:
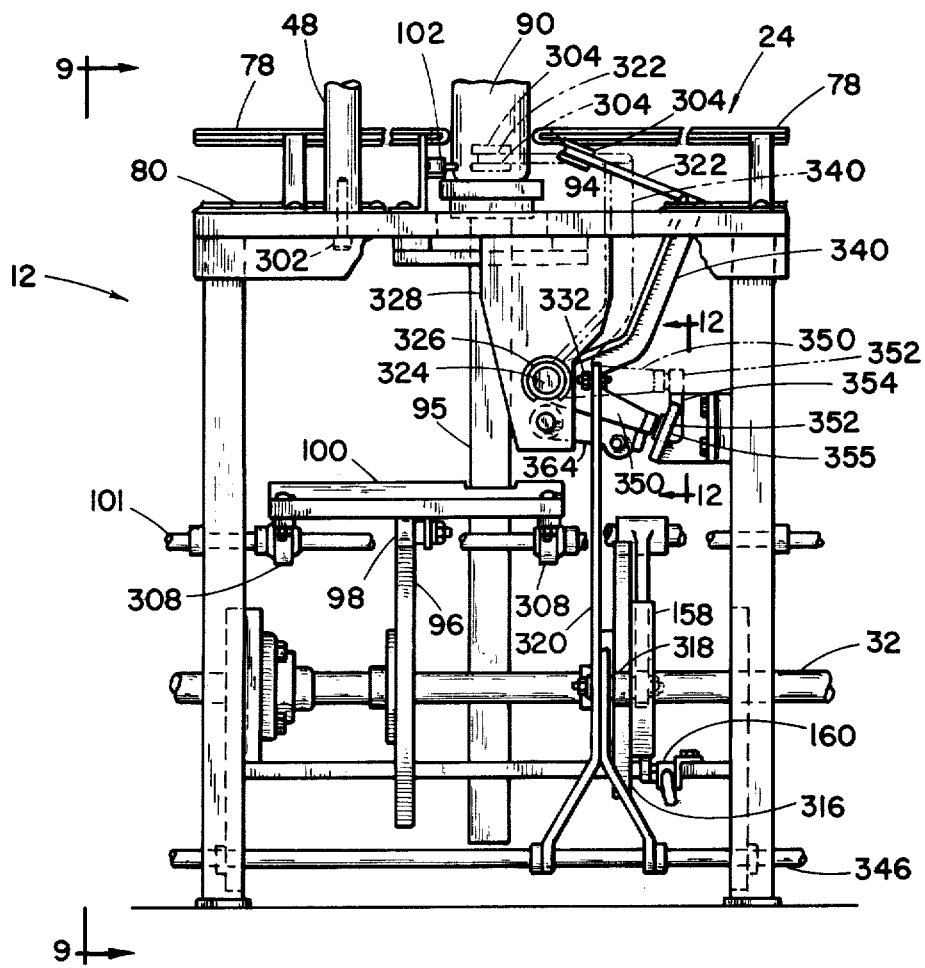
FIG. 11 is a fragmentary side elevation of the operational station container delivery, elevating, and discharge mechanisms as seen along the line 11—11 of FIG. 9.

The views illustrated in FIG. 10 and FIG. 11, as previously described, respectively show a top plan view and a side sectional elevation of the fragmentary enlarged end sectional elevation view as shown in FIG. 9, further detailing the container delivery, elevating, and discharge means of machine 10.

Figure 13:
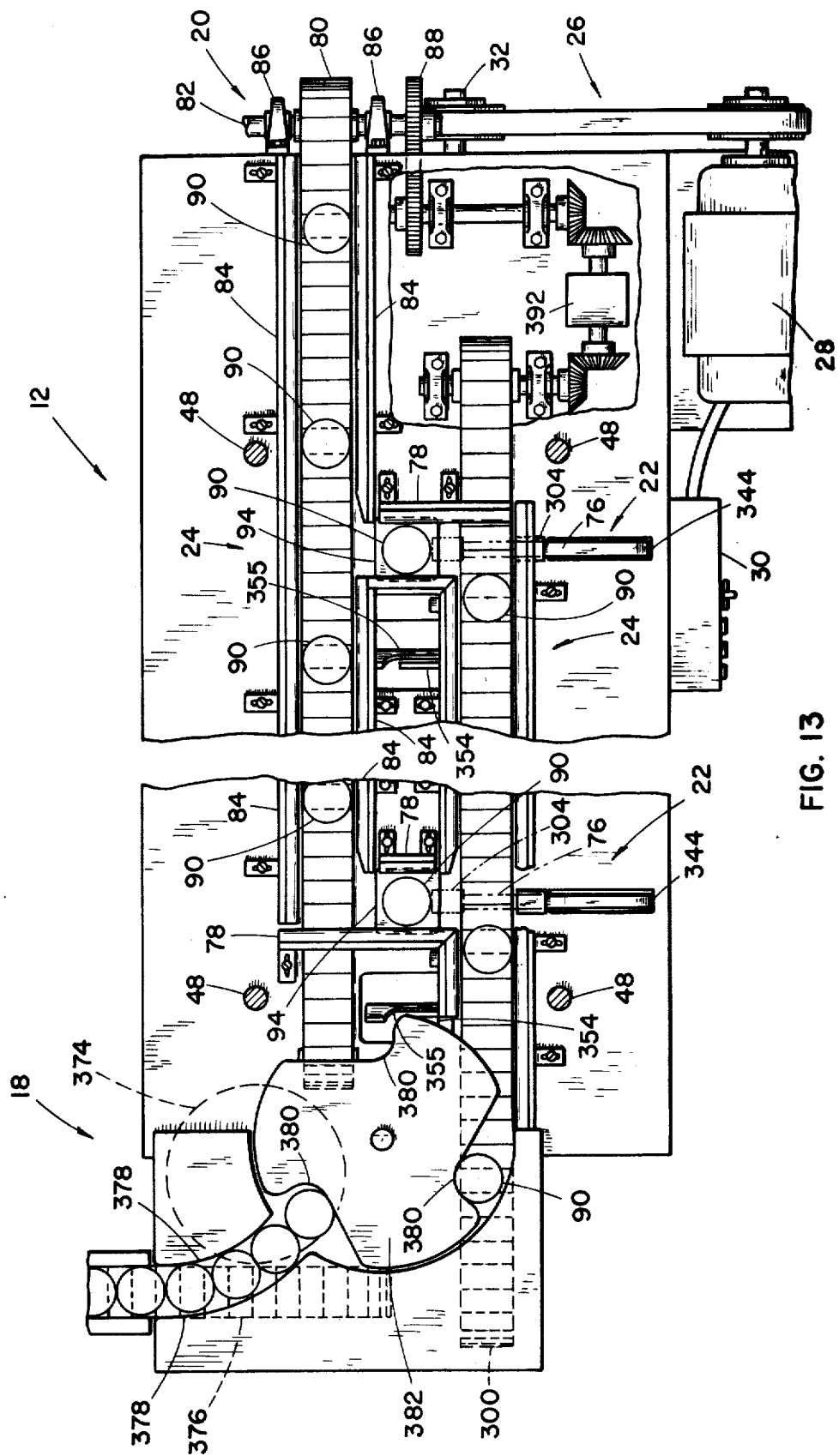
FIG. 13 is an enlarged top plan view of the container feed, delivery and discharge means as seen along the line 13—13 of FIG. 1, the same having been foreshortened to accommodate the sheet.

Referring now to FIG. 13 which shows the container delivery, infeed, and discharge conveyor assemblies of machine 10, wherein the Figure has been foreshortened to accommodate it to the sheet, the containers for net weight filling are delivered to a rotating transfer disk 374 by the container delivery conveyor 376, being guided from the delivery conveyor 376 to the rotating transfer disk by container delivery guides 378. Each container delivered to the transfer disk 374 is sequentially engaged by a pocket 380 of the rotating pocket wheel 382 and rotatably transferred to and positioned upon the container infeed conveyor 300. It should be noted that all elevations of the respective aforementioned transfer points are equal, thereby facilitating container delivery. It should also be noted that the configurations of pockets 380 of the rotating pocket wheel 382 are deisgned to conform with tubular containers of varying diameter.

The discharge conveyor 80 is driven at machine speed off the main drive shaft 32 through the container conveyor drive shaft 82 as previously explained. The container infeed conveyor 300 and the pocket wheel 382 are also driven off the container conveyor drive shaft 82 through the infeed conveyor driving gear 88, but also thereafter through an electric clutch and brake 392 which provides a cyclic transport pause motion in the container infeed conveyor 300, timed with the rotating pocket wheel, so that containers 90 for net weight filling are delivered to positions before the respective container positioning pushers 76 for transport displacement from the container infeed conveyor 300 to the respective container elevating platens 94 of operational stations 16. Since the discharge conveyor 80 continually runs at machine 10 speed, the net weight filled containers 90 previously delivered thereto are cleared for cyclic discharge displacement of newly net weight filled containers 90 from the respective lowered container elevating platens 94 of the respective operational stations 16 upon completion of the respective net weight filling cycles.

Figure 14:
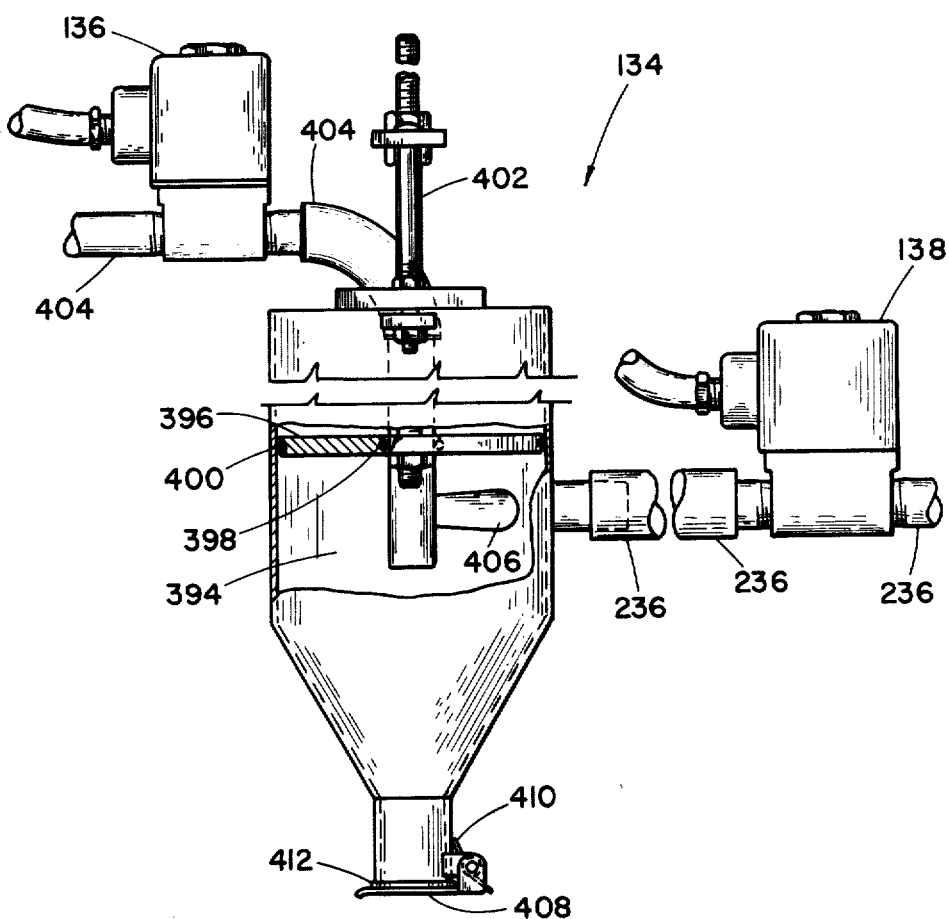
FIG. 14 is a fragmentary enlarged side sectional elevation of the container evacuating chamber, the same having been foreshortened to accommodate the sheet.

Referring now to FIG. 14, wherein is shown an enlarged side sectional elevation of the adjustable container evacuation chamber 134 whereby, as previously described, container 90 evacuation is simultaneously accomplished during the net weight flling operation, it will be noted that the volume of the evacuation chamber 394 is adjustable by means of vertically displaceable plate 396 having an air-tight seal provided within the evacuation chamber per se by means of the interior plate "O" ring 398 and exterior plate "O" ring 400. It also will be noted that the evacuation chamber 394 is in the form of a cyclone collector, admitting the air containing any possible dusty carry over from container 90, tangent to the diameter of chamber 394 and drawing off the air from the vertical center line of chamber 394 through vacuum pump line 404, avoiding further carry over of material to vacuum source.

In use application, volume of the evacuation chamber per se is adjusted by means of vertically displaceable plate 396 assembled to adjustment rods 402 such that the adjusted volume of the evacuation chamber per se will be equivalent to the volume of the container being run in the net weight filling operation. Operationally, with the container evacuation solenoid valve 138 closed and the evacuation solenoid valve 136 open, the adjusted chamber volume per se is evacuated through the vacuum pump line 404. Upon opening of container evacuation solenoid valve 138 the evacuation solenoid valve 136 closes. Afterwards, upon initiation of dispensing of the net weight amount of material from the net weight measuring chamber 38 to a container 90, the container evacuation solenoid valve 138 opens and simultaneous with the net weight dispensing of material the container 90 is evacuated into the evacuation chamber 394 through port 406 by way of evacuation line 236. Upon completion of the net weight fill cycle the container evacuation solenoid valve 138 closes, the evacuation solenoid 136 opens, and the cycle is repeated.

The adjustable container evacuation chamber 134 is also provided with a hinged spring loaded closure 408 at the lower end thereof, wherein said closure 408 is held in the closed position by torsion spring 410 and sealed air-tight by resilient closure gasket 412. Said closure 408 provides a means for cleaning of evacuation chamber 394 as well as a discharge means for any material inadvertently carried over thereto during net weight filling operations.

Figure 15:
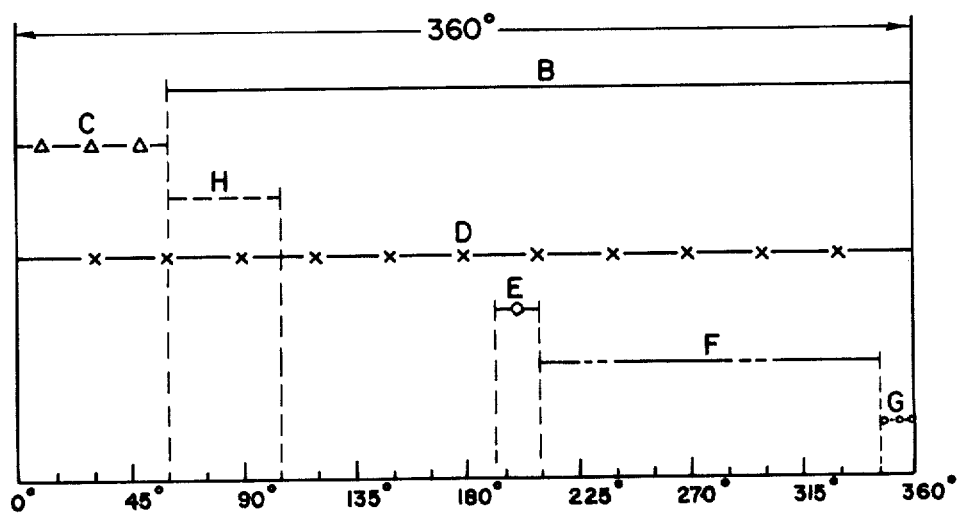
FIG. 15 is an operational station cycle diagram showing the relationship of respective station functions from empty container feeding to filled container discharge.

The diagram shown in FIG. 15 summarizes the relative relationship of the individual concurrent cycles of operation of machine 10 and operational stations 16 as heretofore described. As illustrated therein, the top line, designated as 360°, represents one complete revolution of the main drive shaft 32 of said machine 10. The line "B" represents the transfer of empty containers from the delivery conveyor to the container infeed conveyor. The line "C" represents the concurrent transfer of empty containers from the container infeed conveyor to the elevating platen and the transfer of a net weight filled container from the elevating platen to the discharge conveyor. The line "D" represents the conveyable discharge removal of net weight filled containers by the discharge conveyor. The line "E" represents the elevation of an empty container upon the elevating platen for net weight filling. The line "F" represents the concurrent net weight fill dispensing and container evacuation. The line "G" represents the elevating platen lowering to enable transfer of net weight filled containers to the discharge conveyor. The line "H" represents the concurrent return of conveyor transfer mechanism.

The foregoing description illustrates preferred embodiments of my invention. However, the concepts employed may, based upon such description, be employed in other embodiments without departing from the scope of the invention. Accordingly, the following claims are intended to protect the invention broadly, as well as in the specific forms shown herein.

I claim:

1. An automatically operational net weight filling machine having a plurality of operational stations for weighing and dispensing to containers individually net weight amounts of a loose and flowable dry particulate material, said machine comprising in combination an interconnected vertically and horizontally disposed support frame, a motor to drive said machine, a motor control means, a bulk material delivery means vertically disposed respectively at each of said operational stations said bulk material delivery means adapted to supply each of said operational stations with bulk make-up material during operation, a material staging chamber respectively disposed vertically intermediate of said bulk material delivery means and said support frame at each of said operational stations to receive bulk make-up material delivered from said bulk material delivery means thereto and dispense material therefrom for net weight measurement said material staging chambers being each provided with a bulk material delivery control means connected through a material staging chamber bulk material level control circuit to a material staging chamber discharge valve control means whereby a material staging chamber upper material discharge valve is automatically opened and closed to maintain a constant variable range in level of said bulk make-up material in said material staging chambers and a first electro-magnetic vibration means in the proximity of said upper material discharge valve, a means for reciprocating being a reciprocating container platen at each of said operational stations to position and compressively elevate a container automatically delivered by a container delivery means thereto into a container net weight filling position configuration such that a container is engaged with the base thereof upon said reciprocating container platen and the opening thereof being sealed against a container sealing gasket of a vacuum chuck housing of said operational station, a vacuum means and a second electro-magnetic vibration means in the proximity thereof respectively at each of said operational stations said vacuum means operable to provide evacuation of a container positioned for net weight filling at said operational station and said second vibration means being concurrently operable to vibrate said reciprocating container platen during the net weight material filling of a container configured in the net weight filling position thereon, a net weight measuring chamber respectively at each of said operational stations disposed vertically intermediate of said material staging chamber and said container net weight filling position and adapted to receive material dispensed thereto from said material staging chamber and in turn dispense a net weight amount of material therefrom to said container said net weight measuring chamber being pivotally assembled to a counterweighted balance beam such that when a net weight amount of said material as set by an adjustable net weight measuring means assembled upon said net weight balance beam is received into said net weight measuring chamber an integrated electrical sensing circuit is closed by a means to close said circuit thereby simultaneously and automatically activating a first solenoid means operable to close said upper material discharge valve and activate a second solenoid means operable to elevate the counter-balance end of said balance beam about a pivot point and by means of a mechanical linkage assembly set by a fixed adjustable stop said mechanical linkage assembly pivotally connected to said net weight measuring chamber and a net weight measuring chamber lower material discharge valve centrally located within the radial axis opening of a downwardly disposed cone-shaped terminal end of said net weight measuring chamber to thereby cooperatively open said lower material discharge valve and move said net weight measuring chamber vertically downward sharply to an impact point said impact point being a resilient impact gasket supported by said vacuum chuck housing of said operational station to thereby cause a quick dispensing of the net weight amount of material from said net weight measuring chamber into said container during evacuation and vibration thereof, an integrated control circuit means to activate and control said first and second electro-magnetic vibration means, a plurality of rotating cam means fixedly assembled in a regularly repeating longitudinally spaced relationship upon a main drive shaft rotatably driven by said motor to respectively cycle said reciprocating container platens to withdraw a filled container from and deliver an empty container to said filling position and deliver said filled container to a discharge conveyor, a main drive shaft electric clutch and brake means to control a container infeed conveyor and the transport movement thereof to create a pause in said movement until said net weight amount of said material is dispensed to said net weight measuring chamber, and a plurality of rotating recycle cams fixedly assembled upon said main drive shaft in a regularly repeating longitudinally spaced relationship thereto respectively for each of said operational stations to rotatably engage and close an operational station integrated control circuit recycle switch and also thereby in turn respectively recycle said operational stations of said automatically operational net weight filling machine for continued automatic container net weight filling operations.

2. An automatically operational net weight filling machine according to claim 1 in which said plurality of operational stations are assembled in series upon vertical adjustment means adapting said operational stations to be simultaneously vertically adjustable to accommodate containers of a different vertical dimension.

3. An automatically operational net weight filling machine according to claim 2 in which said vertical adjustment means is comprised of a plurality of vertically extending threaded rods spaced laterally and longitudinally upon said support frame, said threaded rods having respectively threadably assembled to the upper ends thereof threaded sprocket assemblies mutually engaged by a drive chain.

4. An automatically operational net weight filling machine according to claim 3 in which said drive chain is a link chain.

5. An automatically operational net weight filling machine according to claim 1 in which said machine comprises an external ambient atmosphere closed system during the accomplishment of net weight filling operations.

6. An automatically operational net weight filling machine according to claim 1 wherein said bulk material delivery means is comprised of an enclosed screw conveyor communicating between a bulk material storage source and the material staging chamber by means of an enclosed chute, said enclosed screw conveyor being intermittently driven during net weight filling operations by a motor means upon command signal from a photoelectric level control means assembled upon said material staging chamber, thereby enabling the maintenance of a constant variable range in level of said material in said material staging chamber during net weight filling operations whereby a stabilized dispensing of said material therefrom is enhanced.

7. An automatically operational net weight filling machine according to claim 1 in which the lower end of said material staging chamber is comprised of a cone-shaped section.

8. An automatically operational net weight filling machine according to claim 7 in which said material staging chamber is provided with an air knife assembly affixed peripherally about and intermediate the external ends of said cone-shaped section thereof, wherein said air-knife assembly dispenses a directed high-speed flow of gas downward along the interior surface of said cone-shaped section during dispensing of material therefrom in order to further facilitate the dispensing of material therefrom.

9. An automatically operational net weight filling machine according to claim 1 in which said first solenoid means communicates with said upper material discharge valve by means of a connecting rod axially supported intermediate the ends thereof by a guide bushing.

10. An automatically operational net weight filling machine according to claim 9 in which said guide bushing is supported by means of a plurality of radially disposed vertically depending vanes affixed to the removable enclosing material staging chamber cover of said material staging chamber.

11. An automatically operational net weight filling machine according to claim 1 in which said net weight measuring chamber electrical sensing circuit closing means is a magnetic reed switch activated by a magnet assembled to the free end of said balance beam.

12. An automatically operational net weight filling machine according to claim 11 in which said magnetic reed switch is laterally aligned with said magnet at a spaced distance therefrom and vertically adjustable during net weight filling operations with respect to said magnet by means of a vertical adjustment screw threadably communicating through a threaded opening in a vertically displaceable adjustment block upon which said magnetic reed switch is supported by means of a set of vertically spaced spring clips.

13. An automatically operational net weight filling machine according to claim 1 in which said net weight measuring chamber electrical sensing circuit closing means is a linear variable differential transformer assembled to sense balance beam motion.

14. An automatically operational net weight filling machine according to claim 1 in which said adjustable net weight measuring means are individually comprised of a threadably adjustable weight axially assembled upon an adjustable weight set screw wherein said adjustable net weight measuring means are individually adjustable by means of said set screw to change the net weight amount of said material measured out by any one of said operational stations net weight measuring chamber during net weight filling operations.

15. An automatically operational net weight filling machine according to claim 1 in which said vacuum means is comprised of an evacuation chamber provided with a vertically displaceable plate adjustable within said evacuation chamber to provide an evacuation volume equivalent to that of said container being run during net weight filling operations.

16. An automatically operational net weight filling machine according to claim 1 in which absence of a container on said reciprocating container platen, as sensed by an integrated control circuit container detection switch, will void activation of said second solenoid means and thereby prevent the dispensing of material from said net weight measuring chamber.

17. An automatically operational net weight filling machine according to claim 16 in which absence of a container on said reciprocating container platen, as sensed by said integrated control circuit container detection switch, will void recycling of the corresponding operational station and thereby in turn prevent opening of said upper material discharge valve.

18. An automatically operational net weight filling machine having a plurality of vertically adjustable operational stations to accommodate containers of a different vertical dimension and dispense individually to said containers a net weight amount of a loose and flowable dry particulate material, said machine comprising in combination an interconnected vertically and horizontally disposed support frame, a motor to drive said machine, a motor control means, a plurality of elongated parallel guide means assembled upon said support frame adapted to be respectively dimensionally adjustable relative one to the other to accommodate containers of different lateral dimension, a container infeed means mechanically assembled to and longitudinally disposed upon said support frame, a container pusher means assembled upon said support frame respectively at each of said operational stations adapted to reposition containers from said container infeed means to an operational station load position, a means for reciprocating being a reciprocating container platen at each of said operational stations to compressively elevate a container positioned thereon from the operational station load position to a container net weight filling position configuration such that a container is engaged with the base thereof upon said reciprocating container platen and the opening thereof being sealed against a container sealing gasket of a vacuum chuck housing of said operational station, a vacuum means respectively at each of said operational stations to provide concurrent evacuation of a container during the net weight material filling thereof, a bulk material delivery means vertically disposed respectively at each of said operational stations said bulk material delivery means adpated to automatically supply each of said operational stations with bulk make-up material upon demand during net weight filling operations, a material staging chamber communicating with said bulk material delivery means by an angularly depending enclosed chute said material staging chamber being disposed vertically intermediate of said bulk material delivery means and said operational station net weight filling position and provided at the lower central end thereof with an upper material discharge valve, an air knife means assembled in the vicinity of said lower central end of said material staging chamber to facilitate dispensing of material therefrom through said upper material discharge valve, a net weight measuring chamber respectively at each of said operational stations disposed vertically intermediate of said material staging chamber and said container net weight filling position and adapted to receive material dispensed thereto from said material staging chamber and in turn dispense a net weight amount of material therefrom to said container said net weight measuring chamber being pivotally assembled to a counterweighted balance beam such that when a net weight amount of said material as set by an adjustable net weight measuring means assembled upon said balance beam is received into said net weight measuring chamber an electrical sensing circuit is closed by a means to close said circuit thereby to simultaneously and automatically activate a first solenoid means operable to close said upper material discharge valve and activate a second solenoid means operable to elevate the counterbalance end of said balance beam about a pivot point and by means of a mechanical linkage assembly pivotally connecting said net weight measuring chamber to the other end of said balance beam thereby also quickly open a net weight measuring chamber lower material discharge valve centrally located within the radial axis opening of a downwardly disposed cone-shaped terminal end of said net weight measuring chamber and cooperatively move said net weight measuring chamber vertically downward sharply to an impact point said impact point being a resilient impact gasket supported by said vacuum chuck housing of said operational station to thereby cause a quick discharge of the net weight amount of material from said net weight measuring chamber into said container during evacuation thereof, means to activate said reciprocating container platen and withdraw a filled container from said filling position operable by a plurality of rotating cams fixedly assembled in a regularly repeating longitudinally spaced relationship upon a main drive shaft rotatably driven by said motor to respectively cycle said reciprocating container platens to cause withdrawl of a filled container from and delivery of an empty container to said filling position and deliver said filled container to a discharge conveyor, a main drive shaft electric clutch and brake means to control a container infeed conveyor and the transport movement thereof to create a pause in said movement until said net weight amount of said material is dispensed to said net weight measuring chamber, and a plurality of rotating recycle cams fixedly assembled upon said main drive shaft in a regularly repeating longitudinally spaced relationship thereto respectively for each of said operational stations to rotatably engage and close an operational station integrated control circuit recycle switch and also thereby in turn respectively recycle said operational stations of said automatically operational net weight filling machine for continued automatic container net weight filling operations.

19. An automatically operational net weight filling machine according to claim 18 in which said pusher means are provided with a plurality of replaceable container positioning pusher arms of different longitudinal extension dimension thereby providing the means whereby containers of different diameter dimension may be accommodated for net weight filling operations by said machine.

20. An automatically operational net weight filling machine according to claim 18 in which said air knife means is provided with air knife direction adjustment means.

21. A method for automatically filling individual containers with a net weight amount of a loose and flowable dry particulate material comprising delivery of said material from a bulk storage supply source to a material staging chamber, dispensing said material from said material staging chamber into a net weight measuring chamber under a selected atmospheric condition, simultaneously stopping further delivery of said material from said material staging chamber and dispensing the net weight portion of said material from said net weight measuring chamber into a container during concurrent evacuation thereof whereby the dispensing means is accomplished by a contemporaneous sudden discharge opening and a vertical downward displacement of said net weight measuring chamber to an impact point to thereby facilitate dispensing of said net weight portion of said material from said net weight measuring chamber.

* * * * *